Feb. 9, 1943.  W. F. ARNDT  2,310,340
FILM MARKING SYSTEM
Filed July 26, 1940
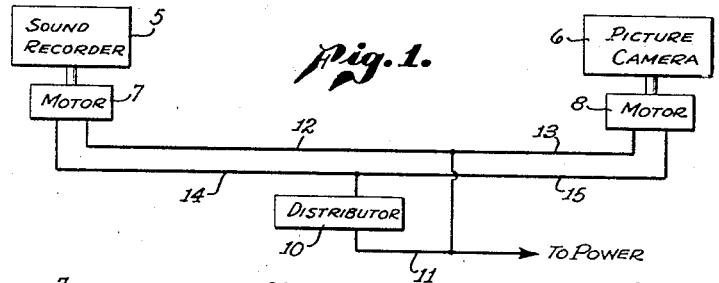
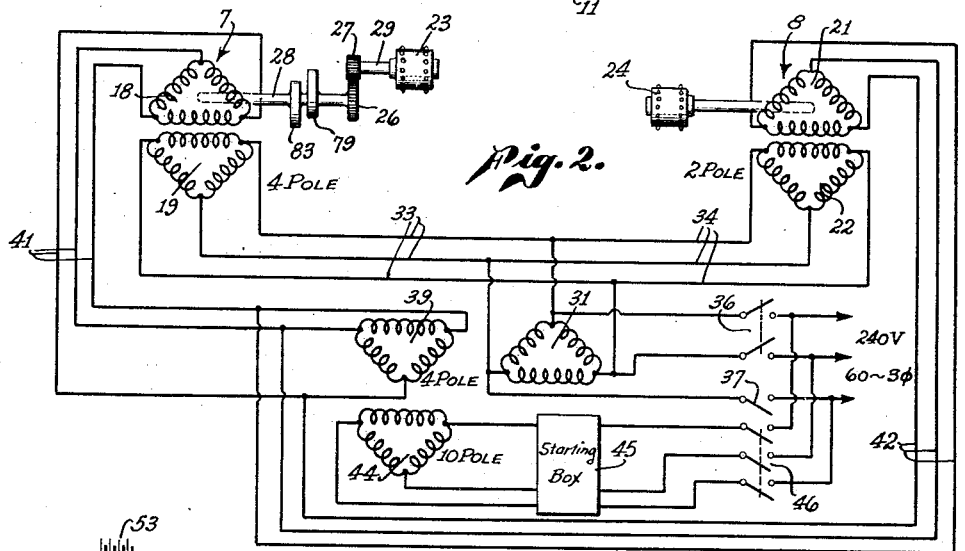
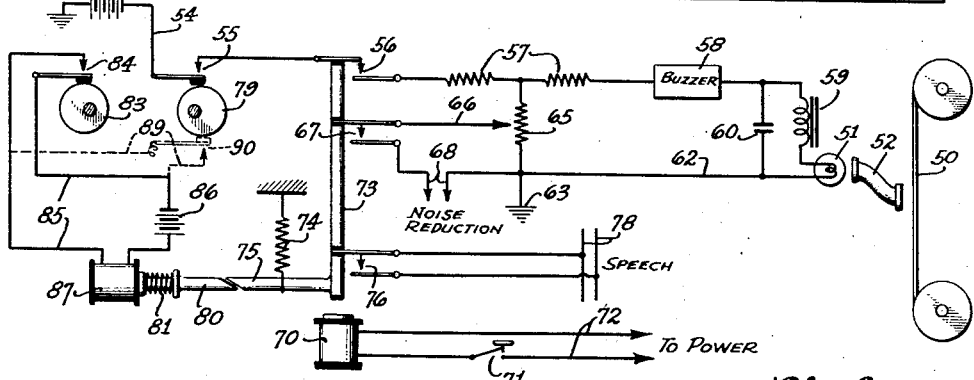
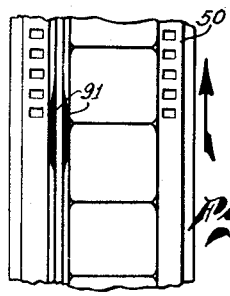
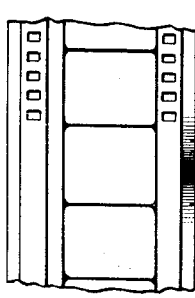
Inventor
WILLIAM F. ARNDT,
Attorney Patented Feb. 9, 1943

2,310,340

UNITED STATES PATENT OFFICE 2,310,340

FILM MARKING SYSTEM

William F. Arndt, Los Angeles, Calif., assignor to Radio Corporation of America, a corporation of Delaware Application July 26, 1940, Serial No. 347,800

8 Claims. (Cl. 88—16.2)

The present invention relates to production of sound motion pictures and particularly to a marking system for facilitating the combining of picture and sound films.

It is well known in the art of motion picture production that the picture is photographed with a picture camera and that the sound is recorded with a separate sound camera located either in a mobile unit near the scene of action or in a central recording building which may be a considerable distance away from the scene of action. Although the driving motor for the picture camera and the driving motor for the sound recorder advance the respective films at the same speed, it is necessary, in order to properly combine the two films, to provide start or synchronizing marks on both negatives.

There are many types of "sync" marking systems now in use, perhaps the most common being known as the "clapperstick" method whereby two sticks are held in front of the picture camera and brought together to make a noise. The sound of the clappersticks is, of course, recorded at the instant they come together, and the picture thereof and the recorded noise mark are then used as synchronization marks. The clapperstick method has several objectionable features such as the time required to operate it, while the sharp noise created in front of the actors is always disturbing. Furthermore, the respective marks made on the films are not particularly satisfactory since the instant of closing might occur during the pull-down of the picture film. Because of these difficulties, other methods have been provided which are not disturbing to the actors, such methods employing fogging lamps in the picture camera and simultaneous marking of the sound negative by the actuation of the sound modulator, these marks being used as synchronization marks in the latter combination of the films. Although these systems are a considerable improvement over clapperstick methods, it is still difficult to provide the proper accuracy, inasmuch as the film is running continuously through the sound recorder and intermittently in the picture camera.

The present invention, therefore, is directed to a system which always drives the two negatives not only at a constant synchronous speed, but also in a definite phase relationship, the marking system being automatically operated to provide the synchronization marks at certain predetermined points on the respective films. The marks are thus easily detectable and have a high degree of accuracy.

The principal object of the invention, therefore, is to facilitate the production of synchronizing marks on picture and sound negatives.

Another object of the invention is to increase the accuracy of synchronously marking picture and sound negatives.

A further object of the invention is to automatically control the predetermined positioning of synchronization marks on picture and sound negatives.

A further object of the invention is to control the recording of a synchronization mark on the sound negative and the photographing of a synchronization mark on a picture negative from the motor system advancing the negatives.

Although the novel features which are believed to be characteristic of this invention will be pointed out with particularity in the appended claims, the manner of its organization and the mode of its operation will be better understood by referring to the following description read in conjunction with the accompanying drawing forming a part thereof, in which Fig. 1 is a diagrammatic view of a drive system for a sound recorder and motion picture camera;

Fig. 2 is a detailed diagrammatic-schematic arrangement of the drive system for the system shown in Fig. 1;

Fig. 3 is a schematic drawing of the marking circuits embodying the invention;

Fig. 4 is a fragmentary view of a sound film negative showing a synchronization mark; and Fig. 5 is a fragmentary view of a picture negative showing a synchronization mark.

Referring now to Fig. 1, a sound recorder 5 and a picture camera 6 are shown driven by respective motors 7 and 8, connected to a Selsyn distributor or transmitter 10. Power is provided for the distributor and the stators of the motors 7 and 8 over conductors 11, 12 and 13, respectively, while the rotors of the distributor and motors 7 and 8 are connected over conductors 14 and 15. Thus, in the operation of a system of this type, the sound recorder may be located a considerable distance from the picture camera, the motors being interlocked and driven at a constant speed from the distributor 10 which may be located at a third point.

In Fig. 2, the details of the system of Fig. 1 are illustrated wherein the sound recorder motor may be either a two- or four-pole motor but is shown as a four-pole motor consisting of a rotor 18 and a stator 19, while the picture camera motor 8 may be either a two- or four-pole motor but is shown as a two-pole motor comprising a rotor 21 and a stator 22. Since the films must be advanced at a constant speed, such as ninety feet a minute, a sprocket 23 of the sound recorder and a similar sprocket 24 of the picture camera must be rotated at a constant speed. However, since the camera motor is illustrated as a two-pole motor which will rotate at twice the speed of the four-pole recorder motor when both are supplied from the same power source, it is necessary to employ a step-up gear ratio of two-to-one in the sound recorder motor which is accomplished by gears 26 and 27 connecting the rotor shaft 28 and the sprocket shaft 29.

The stators 19 and 22 are connected to the stator 31 of the distributor 10 over conductors 33 and 34. These conductors are also connected to the regular power supply through a pair of switch blades 36 and a single blade 37. The rotors 18 and 21 of the motors are interconnected with the rotor 39 of the distributor 10 over conductors 41 and 42. The driving motor 44 for the distributor is connected to the power supply through a starting box 45 and three-pole switch 46. This system is started by first closing the switch 36 which interlocks the motors at a definite position, then by closing switch 37 which tightens the lock, and then by closing the switch 46 which energizes the motor 44 through the starting box 45 to gradually bring the motors up to speed. The switch 46 may be eliminated, the starting box 45 then being connected directly to switches 36 and 37.

As disclosed in my copending application Serial No. 347,799, filed July 26, 1940, when the power supply is a 60-cycle, 3-phase source, the motor 44 has ten poles and the distributor 10 has four poles, the sprockets 23 and 24 will always maintain a constant and the same phase relationship during each running. This is true because the four-pole motor is limited to two positions of interlock, and the two-pole motor to one position of interlock. This fixed phase relationship is utilized to predetermine the position of the start mark made on the respective films.

Referring now to Fig. 3, a picture negative 50 is adapted to have impressed thereon on the edge outside of the sprocket perforations light from a lamp 51 through a light transmitting medium such as a lucite tube 52. The lamp 51 is preferably an argon or other gaseous discharge with little inertia. By impressing the light on the outer edge of the film, no damage is done in case of a false operation of the system. Energy to the lamp 51 is supplied from a D. C. source such as a battery 53 over conductor 54, contact 55 when closed, contact 56 when closed, resistances 57, a buzzer 58 to provide an audible indication of the operation of the marking system, through a filter circuit composed of an inductance 59 and condenser 60, and over conductor 62 to ground at 63. The filter circuit 59—60 is not essential but generally provides smoother operation of the lamp circuit.

The sync mark is made on the sound film negative by a simultaneous actuation of the noise reduction elements thereof which are ordinarily in a position to prevent any substantial amount of light from reaching the film. The noise reduction portion of the sound recorder is energized over the portion of the lamp circuit starting at the direct current source 53, then over conductor 54, through contacts 55 and 56 when closed, through one of resistances 57, over potentiometer resistance 65, conductor 66, contact 67 when closed, over conductors 68 to the noise reduction portion of the recording apparatus and then to ground at 63. It will be noted that the contacts 56 and 67 are operated upon the actuation of a relay 70 which is energized by a manually operable key 71 over conductors 72 from any suitable power supply source.

The normal position of the contacts 56 and 67 is open and the contacts are maintained in their open position by a bias spring 74 attached to a cross-arm 75 which in turn is attached to relay armature 73. Also closed by operation of the relay 70 is a contact 76 which is for the purpose of shorting the galvanometer speech circuit 78 to prevent operation thereof in case sound is impressed upon the microphone at the instant of operation of the marking system. In other words, if the director or someone on the stage gave an order at the instant the key 71 was closed, the microphone current would not only operate the galvanometer, but also the noise reduction portion of the system and it would be difficult to recognize the sync mark on the sound negative. Thus, to prevent this situation from arising, the speech circuit 78 is short-circuited during the marking operation.

In the above circuits, it will be noted that the manual closing of key 71 only closes contacts 56, 67 and 76, which does not necessarily energize the marking elements since the contact 55 may not be closed at that particular instant. Contact 55 is operated periodically, however, it being closed during a certain portion of the revolution of a cam 79 mounted on shaft 28 of motor 7 and opened during the remaining cycle of rotation of the cam. The cam may also be located on a rotating element of motor 8. Thus, if the key 71 is held down, a series of marks will be made along the respective films as the cam 79 makes and breaks the contact 55.

The key 71, however, may be momentarily closed and the system will automatically produce the proper marks. This is accomplished by maintaining the contacts 56, 67 and 76 in a closed position by the extension 75 locking itself over a latch 80 held in normal locking position by a spring 81. Thus, if the contact 55 is open at the time the key 71 is momentarily closed, the contacts 56, 67 and 76 are locked by the latch 80 until the cam 79 closes the contact 55. After contact 55 has been made, however, a second cam 83, rotating out of phase with respect to cam 79, closes a contact 84 connected in series over conductors 85 with a potential supply such as a battery 86 and a relay 87. The making of contact 84 and the consequent energizing of relay 87 moves the latch 80 to the left, thus permitting the contacts 56, 67 and 76 to open to break the marking circuits. To similarly accomplish this result, the cam 79 may serve both functions as shown by the dotted conductors 89 in series with a contact 90. Thus, the two contacts 55 and 84 or 90 operate in phase opposition to provide the marks upon the respective films after the depression of the key 71. Cam 83 may also be driven by motor 8.

Referring now to Fig. 4, the type of marks formed by operation of the noise reduction portion of the system in a variable area bilateral type of recording are shown at 91. It is to be noted that the shutters are opened at the middle of the upper frame and are closed in the middle of the lower adjacent frame, the film having been advanced in the direction of the arrow. In Fig. 5, the complementary mark made on the picture negative is shown, this mark comprising a heavy dark portion 92 and tapered portions 93 and 94 on either side thereof. The tapered portions are caused by the warming up of the lamp 51 and the movement of the film, while the well-defined dark mark is produced during the stationary period of the picture negative. Because of the isochronous operation of the sprockets 23 and 24 and the fact that the energization of the marking circuits is under control of the driving motors for the sprockets, the dark mark will always occur exactly opposite the center of a picture frame for all picture negatives, while the ends of the marks 91 on the sound negative will always occur at the center of the corresponding frame. The marks are thus accurate to a very small fraction of a frame. The marks shown in Figs. 4 and 5 will always be produced as disclosed in these figures regardless of when the key 71 is closed or regardless of how many marks are made.

The reason why the above accuracy is obtainable in the production of the synchronization marks will now be explained. As mentioned above, the driving sprockets 23 and 24 advance the films at a constant speed and at the same time maintain with each other a constant phase relationship regardless of their rest positions after each stop. Although the picture negative is advanced intermittently, its average rate of advancement is exactly the same as that of the sound negative. Thus, when the motors are up to speed and it is desired to mark each film to provide the necessary start marks, the key 71 is closed momentarily. This operation closes contacts 55, 67 and 76, and should the cams be in the position shown in Fig. 3, the contacts will be locked by the latch 80. Now, since the cams 79 and 83 are mounted on the drive shaft of one of the motors such as shown in Fig. 2, the contact 55 will be closed at a point having a definite timed relationship with respect to the sound negative and the picture negative. Thus, the closure of contact 55 will energize the lamp 51 during one intermittent movement of the film 50, which will correspond to one frame advancement of the sound negative. During the predetermined time the contact 55 is closed, the sound negative is given a mark of a corresponding length, as shown at 91.

The assurance that a mark will be made is provided by the locking of armature 73 to maintain contacts 56, 67 and 76 closed for at least one cycle of cam 79. The closure of either contact 84 or 90 will, of course, release the armature of relay 70 and open contacts 56, 67 and 76. So by the use of a constant phased interlock system and an automatic control circuit for the marking elements driven thereby, the sync marks always occur at the same points along the respective films, thus facilitating the work of the editors in locating the marks as well as providing a greater accuracy in combining the respective films. If a series of marks are made on each film by holding the key 71 closed, the marks will of course be periodically spaced by the cam 79 which will facilitate the alignment of the two films for reproduction in editing machines or for combining into the final print.

Although the above marking system has been described in connection with a recording system employing noise reduction elements such as shutters, it is to be understood that it is applicable to class B or combination class A—B systems having inherent noise reduction, in which case the contact 76 would be normally closed and in series with the microphone circuit and opened upon actuation of relay 70 while an oscillator would replace battery 53 or at least be used for actuating the galvanometer to mark the sound negative.

I claim as my invention:

1. In a sound picture system, the combination of a picture camera with driving means therefor, a sound recorder with driving means therefor, a light source for exposing a film in said picture camera, a light source for exposing a film in said recorder, said respective driving means accelerating and advancing both of said films at a constant speed, a circuit for energizing said first-mentioned light source and for exposing said recorder film to said second-mentioned light source, and means under control of at least one of said driving means for controlling said circuit, said means including a manually operable means for locking said energizing circuit in an energizing position and an automatically operable means for energizing said energizing circuit and for releasing said manually operable means.

2. A sound picture system in accordance with claim 1 in which said automatic operable means includes a cam for periodically closing and opening said circuit, said cam being driven by at least one of said driving means, the closing and opening of said circuit having a predetermined relationship with respect to the rate of advancement of said films.

3. A sound recording system comprising a picture camera adapted to advance a film at a certain acceleration and at a certain constant speed, a sound recorder adapted to advance a second film at said same certain acceleration and constant speed, means at said recorder and at said camera for driving said recorder and camera, means for light exposing said picture camera film, means for light exposing said sound recorder film, a manually controlled lock switch for adjusting said exposing means to an operative position, an intermittently operable switch driven by at least one of said driving means for actuating said exposing means and simultaneously controlling the time of light exposing both of said films, the points of exposure of said films always occurring at the same distance from the same respective start positions of said films, and automatic means for readjusting said manually controlled lock switch after actuation of said intermittent switch.

4. A system in accordance with claim 3 in which said intermittent switch energizes both of said light exposing means at a rate and for a duration dependent upon the speed of advancement of said films.

5. A marking system for a plurality of films comprising means for accelerating and advancing one of said films, means for accelerating and advancing another of said films at the same rate of acceleration and advancement, independent means for exposing each of said films, an electrical circuit for energizing said independent means, and means for controlling said electrical circuit, said last-mentioned means comprising manually operable means for roughly determining the closing time of said electrical circuit and period of application of said exposing means, means driven by at least one of said accelerating and advancing means for determining the exact closing time of said electrical circuit and the exact points of exposure of said films with respect to the starting positions of said films, and means for releasing said manual means after operation.

6. A film marking system in accordance with claim 5 in which said accelerating means controls the actuation of said releasing means.

7. A film marking system for a plurality of films comprising means for advancing one of said films, independent means for advancing a second of said films, means for electrically interlocking said advancing means for advancing said films at equal rates per unit of time, means for simultaneously exposing both of said films, means for energizing said exposing means, and a combination mechanical and electrical means interposed between said energizing means and said exposing means, said mechanical means being manually operated to adjust said electrical means to operative position and roughly determine the time and period of marking of said films, and said electrical means being operated by one of said film advancing means for energizing said electrical means for exactly determining the points of exposure and length of exposure of said films and for readjusting said mechanical means.

8. A film marking system in accordance with claim 7 in which said manual means for starting the operation of said automatic means includes a locking latch switch, and said electrical means including a cam switch driven by one of said film advancing means.

WILLIAM F. ARNDT.